UNITED STATES PATENT OFFICE 2,315,505

HYDROGENATED PHENANTHRENE COMPOUND AND A METHOD OF MAKING THE SAME

Elisabeth Dane, Munich, Germany, assignor to Schering Corporation, Bloomfield, N. J., a corporation of New Jersey No Drawing. Application November 4, 1939, Serial No. 302,926. In Germany November 4, 1938

12 Claims. (Cl. 260—341)

This invention relates to condensation products of 3,4-dihydronaphthalenes having an α-unsaturated hydrocarbon residue at the carbon atom 1, and particularly to hydrogenated phenanthrene compounds and a method of making the same, and is a continuation-in-part of the copending applications Serial No. 232,087, filed September 28, 1938, and Serial No 207,061, filed May 10, 1938, Patent 2,230,233 Feb. 4, 1933.

The object of the U. S. application Ser. No. 207,061 is the production of hydrogenated indane-diones by condensation of organic compounds containing conjugated double-bonds, for instance, butadienes, isoprenes, cyclopentadienes, cyclohexadienes, phellandrenes, myrcenes, 1-vinyl-3,4-dihydro-6 - methoxy - naphthalene and the like, with cyclopentenediones by making use of the "dien" synthesis of Diels-Alder.

In U. S. application Serial No. 232,087, on the other hand, methods are described whereby, among others, valuable compounds are obtained by condensation of compounds containing besides a double bond a triple bond in conjugation thereto, especially of partially hydrogenated alkinyl-naphthalenes, with philodienic compounds by means of the dien-synthesis according to Diels-Alder. Thus, it is possible to obtain compounds with a polynuclear carbon skeleton, such as compounds of the phenanthrene series.

Now, I have found that it is possible to influence the dien-synthesis essentially, if the reaction is carried out in the presence of halogen-compounds. By addition of such halogen compounds the speed of reaction is catalytically accelerated, the yield increased and the steric course of addition influenced. This is the case especially with 1-X-3,4 - dihydro - 6Y - naphthalenes of the formula

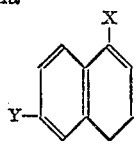

wherein X is a radical having α and β-carbons which are joined by an unsaturated bond, Y being hydroxyl or a group convertible thereinto with the aid of hydrolysis.

Hydrogen bromide represents an especially favourable catalyst. The same result, however, can be obtained by using crude starting materials containing bromine, as are formed, for instance, according to Example 2 of specification Serial No. 232,087 by the Grignard reaction, wherein 5 parts of 1-keto-6-methoxy-tetrahydro naphthalene dissolved in 150 parts of absolute ether are reacted with the mixture obtained by introducing dry acetylene at 1 at., gauge, into an etheral solution of ethyl magnesium bromide consisting of 5 parts magnesium, 25 parts ethyl bromide and 150 parts of absolute ether.

The influence of the presence of a compound containing halogen on the dien-synthesis may be illustrated by the following examples without, however, being limited to them.

If the condensation of acetylene with methoxy-tetralone is carried out according to the method of Dane, Höss, Bindseil and Schmitt (cf. Liebigs Annalen, vol. 532 p. 39 ff. (1937)) without any precautionary measures, on high vacuum distillation fractions containing bromine are obtained. On condensation of such fractions of 1-ethinyl-3,4-dihydro-6-methoxy-naphthalene formed by said synthesis with maleic acid anhydride, the fractions having the highest bromine content react the best, thereby forming for the most part methoxy tetrahydrophenanthrene dicarboxylic acid anhydride.

But also from such fractions containing only little halogen or none at all the last mentioned compound is obtained in a very good yield, if sufficient amounts of hydrogen bromide are added to the ethereal reaction solution, as is evident from the following comparative examples:

Equal quantities of 1-ethinyl-6-methoxy-3,4-dihydronaphthalene are dissolved in equal volumes of dried ether. One of these solutions is allowed to react with an equivalent quantity of maleic acid for 1–2 days, while to another solution there is added also a small amount of a 5% solution of hydrogen bromide in ether. In the first case the condensation product contains 2 mols of maleic acid, while in the presence of hydrogen bromide for the most part only one mol of maleic acid is added.

In a similar manner the course of reaction is facilitated and the yield is increased when condensing crude 1-ethinyl-3,4-dihydro-6-methoxy-naphthalene containing bromine with propiolic acid-ethyl-ester, with cyclopentenones or with other philodienic compounds.

In many cases also the solvent used, the concentration of the reaction compounds and the temperature are of importance. According to the dien-synthesis maleic acid anhydride reacts with ethinyl-methoxy-dihydronaphthalene, thereby forming 7-methoxy-tetrahydrophenanthrene-1.2-dicarboxylic acid anhydride I of the melting point 205° C. But the reaction does not stop at this stage, for, a second mol of maleic acid anhydride is added with opening of one anhydride nucleus, thus forming an acid II of the melting point 263° C.

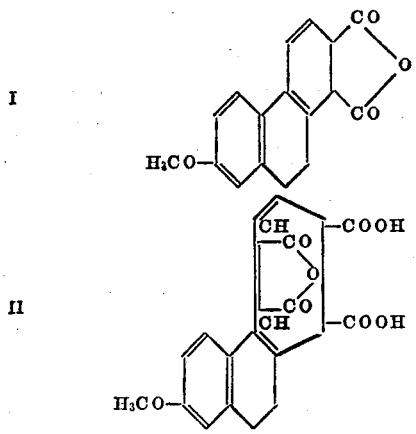

By adding water-free hydrogen bromide to the reaction mixture the condensation may be arrested at the first stage, as is shown by the table at the end of this specification.

Comparative experiments were made as follows:

1 g. of ethinyl-methoxy-dihydronaphthalene is dissolved in 5 ccs. of dried ether, the desired amount of hydrogen bromide dissolved in dried ether is added and the reaction mixture made up to 25 ccs. with dried ether. Then 2 gs. of maleic acid anhydride are dissolved in the reaction mixture by shaking and the whole is allowed to stand at room temperature for one day. The crystals formed are removed by filtration with suction, washed with ether and dried (amount A of the table). The precipitate is then treated in the cold with 2n ammonia solution, whereby the compound II is dissolved. The remaining compound I is washed with water and dried (amount B of the table).

From the original ethereal solution a second crystallisation is obtained (amount C of the table), consisting of compound II, which is readily and completely soluble in cold diluted ammonia solution.

|  | Experiment | | | | |
| --- | --- | --- | --- | --- | --- |
|  | 1 | 2 | 3 | 4 | 5 |
| HBr-addition grams | | 0.01 | 0.03 | 0.04 | 0.52 |
| Amount A__grams | 0.37 | 0.48 | 0.91 | 0.95 | 1.10 |
| Amount B__grams | 0.08 | 0.17 | 0.80 | 0.84 | 0.98 |
| Melting point °C | 178/187 | 189/192 | 195/197 | 195/197 | 195/199 |
| Amount C__grams | 0.95 | 0.74 | 0.37 | 0.31 | 0.38 |
| Melting point °C | 250/255 | 250/258 | 255 | 253 | 255 |
| Total yield__grams | 1.32 | 1.22 | 1.23 | 1.28 | 1.48 |

Of course, many changes and variations in the reaction components, the solvents used, the temperature employed, and so forth, may be made by those skilled in the art in accordance with the principles set forth herein and in the claims annexed hereto.

What I claim is:

1. A method for the production of phenanthrene derivatives, comprising condensing a 3,4-dihydro-naphthalene having the ethinyl group attached to the 1-carbon atom, with an organic compound having at least one reactive double bond and capable of taking part in the diene-synthesis of Diels-Alder, in the presence of a halogen compound.

2. A method for the production of phenanthrene derivatives, comprising condensing a 3,4-dihydro-naphthalene having the ethinyl group at the 1-carbon atom, with an organic compound having at least one reactive double bond and capable of taking part in the diene-synthesis of Diels-Alder, in the presence of a bromine compound.

3. A method for the production of phenanthrene derivatives, comprising condensing 1-ethinyl 3,4-dihydro-naphthalene having in the 6-position a member of the group consisting of the hydroxy group and group convertible thereinto with the aid of hydrolysis, with an organic compound having at least one reactive double bond and capable of taking part in the diene-synthesis of Diels-Alder, in the presence of a halogen compound.

4. A method according to claim 2, wherein the condensation is carried out in the presence of a halogen hydride.

5. A method according to claim 2, wherein the condensation is carried out in the presence of hydrogen bromide.

6. A method according to claim 3, wherein the condensation is carried out in the presence of a halogen hydride.

7. A method according to claim 3, wherein the condensation is carried out in the presence of hydrogen bromide.

8. A method according to claim 3, wherein crude 1-ethinyl-3,4-dihydro-6-methoxy-naphthalene together with a halogen compound is used as starting material.

9. A method according to claim 1, wherein the organic compound having at least one reactive double bond is maleic anhydride.

10. A method according to claim 1, wherein the organic compound having at least one reactive double bond is maleic anhydride, the halogen compound being hydrogen bromide.

11. A method according to claim 3, wherein the organic compound having at least one reactive double bond is maleic anhydride.

12. A method according to claim 3, wherein the organic compound having at least one reactive double bond is maleic anhydride, the halogen compound being hydrogen bromide.

ELISABETH DANE.

CERTIFICATE OF CORRECTION.

Patent No. 2,315,505. April 6, 1943.

ELISABETH DANE.

It is hereby certified that error appears in the printed specification of the above numbered patent requiring correction as follows: Page 2, second column, line 26, for "group" second occurrence, read --groups--; page 2, second column, line 32, for the claim reference numeral "2" read --1--; and that the said Letters Patent should be read with this correction therein that the same may conform to the record of the case in the Patent Office.

Signed and sealed this 22nd day of June, A. D. 1943.

(Seal)

Henry Van Arsdale,
Acting Commissioner of Patents.